United States Patent
Feil

(10) Patent No.: US 9,035,821 B2
(45) Date of Patent: May 19, 2015

(54) OPTIMIZING SWITCHING SEQUENCE IN THE CASE OF SWITCHED ANTENNA ARRAYS

(75) Inventor: Peter Feil, Ulm (DE)

(73) Assignee: Endress+Hauser GmbH +Co. KG, Maulburg (DE)

( * ) Notice: Subject to any disclaimer, the term of this patent is extended or adjusted under 35 U.S.C. 154(b) by 715 days.

(21) Appl. No.: 13/378,693

(22) PCT Filed: May 19, 2010

(86) PCT No.: PCT/EP2010/056857
§ 371 (c)(1),
(2), (4) Date: Mar. 1, 2012

(87) PCT Pub. No.: WO2010/145904
PCT Pub. Date: Dec. 23, 2010

(65) Prior Publication Data
US 2012/0182174 A1    Jul. 19, 2012

(30) Foreign Application Priority Data

Jun. 17, 2009   (DE) .......................... 10 2009 027 003

(51) Int. Cl.
*G01S 13/58* (2006.01)
*G01S 13/08* (2006.01)
(Continued)

(52) U.S. Cl.
CPC ................. *H01Q 3/26* (2013.01); *H01Q 3/247* (2013.01); *G01S 13/422* (2013.01); *G01S 2013/0254* (2013.01); *G01S 2013/0263* (2013.01)

(58) Field of Classification Search
CPC ............... G01S 3/00; G01S 3/02; G01S 3/04; G01S 3/72; G01S 3/74; G01S 2013/0236; H01Q 3/00; H01Q 21/29; H01Q 25/00; H01Q 3/24; H01Q 3/247
USPC ............... 342/70–72, 79, 104, 107, 109, 113, 342/118, 133, 139, 146, 175, 194–196
See application file for complete search history.

(56) References Cited

U.S. PATENT DOCUMENTS 3,999,182 A * 12/1976 Moeller et al. ................. 342/372
5,949,365 A *  9/1999 Wagner .......................... 342/70
(Continued)

FOREIGN PATENT DOCUMENTS

DE    112006003644 T5    12/2008
DE    102008054228 A1    5/2009

OTHER PUBLICATIONS

English Translation of IPR.
(Continued)

*Primary Examiner* — Peter Bythrow
(74) *Attorney, Agent, or Firm* — Bacon & Thomas, PLLC

(57) ABSTRACT

An antenna array for a radar sensor, wherein the antenna array has a number of antenna elements linearly arranged next to one another. The antenna elements are designed for transmitting or receiving a radar signal, and the antenna array has a switching unit, which is designed to connect the antenna elements according to a predetermined switching sequence individually, one after the other in time, with a transmitting or receiving unit of the radar sensor. The switching sequence, according to which the antenna elements are connected one after the other with the transmitting or receiving unit, deviates from the spatial sequence of the antenna elements in the antenna array.

18 Claims, 6 Drawing Sheets

(51) Int. Cl.
*G01S 13/00* (2006.01)
*H01Q 3/26* (2006.01)
*G01S 13/42* (2006.01)
*H01Q 3/24* (2006.01)
*G01S 13/02* (2006.01)

(56) References Cited

U.S. PATENT DOCUMENTS

| | | | |
|---|---|---|---|
| 6,031,483 A * | 2/2000 | Urabe et al. | 342/70 |
| 6,292,129 B1 * | 9/2001 | Matsugatani et al. | 342/70 |
| 6,573,859 B2 * | 6/2003 | Tokoro | 342/70 |
| 7,495,603 B2 * | 2/2009 | Honda et al. | 342/70 |
| 7,525,479 B2 * | 4/2009 | Nagai | 342/158 |
| 7,567,201 B2 * | 7/2009 | Miyake | 342/70 |
| 7,663,537 B2 * | 2/2010 | Suzuki et al. | 342/133 |
| 7,898,460 B2 * | 3/2011 | Nishimura et al. | 342/27 |
| 7,928,897 B2 * | 4/2011 | Ishii et al. | 342/105 |
| 2003/0052813 A1 * | 3/2003 | Natsume | 342/70 |
| 2006/0261968 A1 * | 11/2006 | Shirakawa | 340/671 |
| 2008/0291088 A1 * | 11/2008 | Nagai | 342/374 |
| 2009/0021422 A1 * | 1/2009 | Abe et al. | 342/195 |
| 2009/0121916 A1 * | 5/2009 | Miyake | 342/70 |

OTHER PUBLICATIONS

International Search Report.
German Search Report.
Moon-Sik Lee, Vladimir Katkovnik and Yong-Hoon Kim, "System Modeling and Signal Processing for a Switch Antenna Array Radar", 2004 IEEE.

* cited by examiner

OPTIMIZING SWITCHING SEQUENCE IN THE CASE OF SWITCHED ANTENNA ARRAYS

TECHNICAL FIELD

The invention relates to an antenna array for a radar sensor. Furthermore, the invention relates to a radar sensor, as well as to a method for operation of a radar sensor.

BACKGROUND DISCUSSION

For determining the angular position of a target, radar sensors are applied, which comprise an antenna array either in the transmission path or in the receiving path. The antenna array has a number of antenna elements arranged linearly next to one another. In such case, the phase progression of the received signals associated with the individual antenna elements depends on the angular position of the target.

In the case of static targets, an angular position of a target can be ascertained with such antenna arrays. In the case of moving targets, however, a superpositioning of the phase progression caused by the angular position of the target and the phase progression caused by the velocity of the target occurs. In such case, only with complex analytical technologies, such as, for example, digital beam forming, is it possible to ascertain both the angular position as well as also the velocity of the target.

Such analytical techniques are, for example, described in the article "System modeling and signal processing for a switch antenna array radar" by Lee et al., IEEE Transactions on Signal Processing, Vol. 52, No. 6, 2004, in the article "High-resolution frequency-wavenumber spectrum analysis" by J. Capon, Proceedings of the IEEE, vol. 57, No. 8, 1969, and in the article "Multiple emitter location and signal parameter estimation", IEEE Transactions on Antennas and Propagation, vol. 34, No. 3, 1986.

SUMMARY OF THE INVENTION

An object of the invention is to provide a radar sensor, which enables reliable detection of angular position also in the case of moving targets.

In the case of the antenna array of the invention, the switching sequence, according to which the antenna elements are individually connected, one after the other in time, with a transmitting or receiving unit of the radar sensor, deviates from the spatial sequence of the antenna elements in the antenna array.

When the antenna elements are connected with the transmitting or receiving unit corresponding to a switching sequence selected in such a manner, it is prevented that the phase contributions caused by a velocity of the target bring about a phase progression linearly rising or falling along the antenna arrays. Such a phase progression caused by a velocity of the target can be prevented in the case of the solution of the invention. In this respect, the linear phase progression along the antenna array is determined exclusively by the angular position of the target, while the velocity of the target in the case of a suitable setting of the switching sequence certainly makes contributions to phase, but does not, however, make a contribution to the linear phase progression along the antenna arrays.

In this respect, a suitable defining of the temporal switching sequence of the antenna elements allows the angular position of the target to be determined directly, based on the ascertained phase progression. An essential simplifying in the case of the angle determination can be achieved in comparison with earlier solutions, in the case of which complex calculations must be performed in order to ascertain separately the angular position and velocity of the target. The invention enables an angle-true mapping even of moving targets.

Via a suitable defining of the switching sequence, phantom targets occurring in the angular regions can additionally be limited to certain angular regions and lessened in their intensity, which further simplifies the evaluation.

BRIEF DESCRIPTION OF THE DRAWINGS

The invention will now be explained in greater detail on the basis of the appended drawing, in which number of examples of embodiments are presented. The figures of the drawing show as follows.

DETAILED DISCUSSION IN CONJUNCTION WITH THE DRAWINGS

For determining the propagation direction of electromagnetic waves, linear antenna arrays are frequently applied, which comprise a number n of antenna elements arranged next to one another in a row, wherein n is a natural number. Such linear antenna arrays can be applied, for example, in radar systems, in order to determine the angular position of a target.

Figure 1:
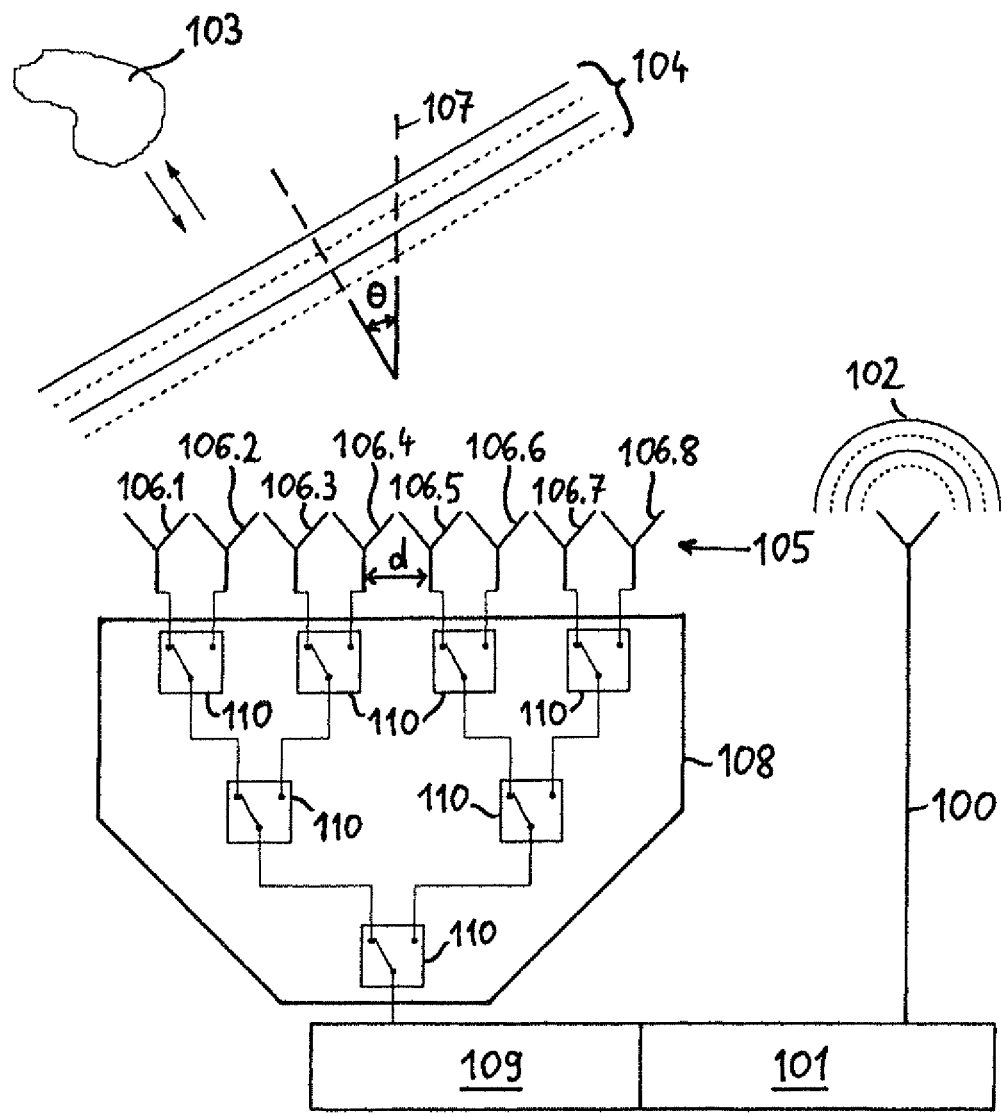
FIG. 1 is a radar sensor with an antenna array in the receiving path.

In FIG. 1, a radar system is shown, which has an antenna array in the receiving path. The radar system includes a transmitting antenna 100, which is connected with a transmitter unit 101 and radiates a transmission signal 102. By reflection of this transmission signal 102 off a target 103, a wavefront 104 is produced. First, it should be assumed that the target 103 is a static target.

The wavefront 104 reflected off the target 103 impinges on the antenna array 105, which is part of the receiving path. The antenna array 105 includes n antenna elements arranged next to one another in a row. In the case of the form of embodiment shown in FIG. 1, the antenna array 105 comprises eight antenna elements 106.1 to 106.8 linearly arranged next to one another, wherein the distance between neighboring antenna elements is labeled "d".

Wavefront 104 is inclined with respect to the antenna array 105 by certain angle of inclination θ relative to the normal 107. By the inclined incidence of the wavefront 104 on the antenna array 105, a phase progression is impressed on the signals received by the individual antenna elements 106.1 to 106.8. This means that a signal received by a particular antenna element is offset in comparison to a signal received by the preceding antenna element by a certain phase, which depends on the angle of incidence θ of the wavefront 104. Proceeding from this phase progression, the angle of incidence θ of the wavefront 104 can be determined.

According to the form of embodiment shown in FIG. 1, the antenna array 105 is a switched antenna array. This means that, for evaluation of the received signals, the antenna elements 106.1 to 106.8 are individually connected via a switching unit 108 one after the other with an evaluation unit 109 of the radar sensor.

Each of the antenna elements 106.1 to 106.8 can be connected, for example, during a switching clock period, with the evaluation unit 109, in order to, in this way, evaluate the signal received by the respective antenna element. Then, the next antenna element is switched in. Typically, the individual antenna elements 106.1 to 106.8 are connected individually one after the other with the evaluation unit 109 corresponding to their spatial arrangement, either from right to left or from left to right, in order to successively determine the phases of the different received signals. From the phase ascertained in this manner, the angular position $\theta_{target}$ of the target 103 can then be derived.

The switching unit 108 can be implemented, for example, as a switching tree, which includes a plurality of switching elements 110. In radar technology, the individual switch elements 110 of switching unit 108 can be implemented preferably with help of PIN diodes.

In the case of the form of embodiment shown in FIG. 1, only a single evaluation unit 109 is required for evaluation of all receiving channels. This solution is, consequently, clearly more cost effective than to provide a separate evaluating electronics for each receiving channel.

In the case of the form of embodiment shown in FIG. 1, for determining the direction of an electromagnetic wave or the angular position of a target, an antenna array is applied in the receiving path. According to an alternative form of embodiment, it is, however, likewise possible to apply an antenna array in the transmission path for determining the angular position of a target.

Figure 2:
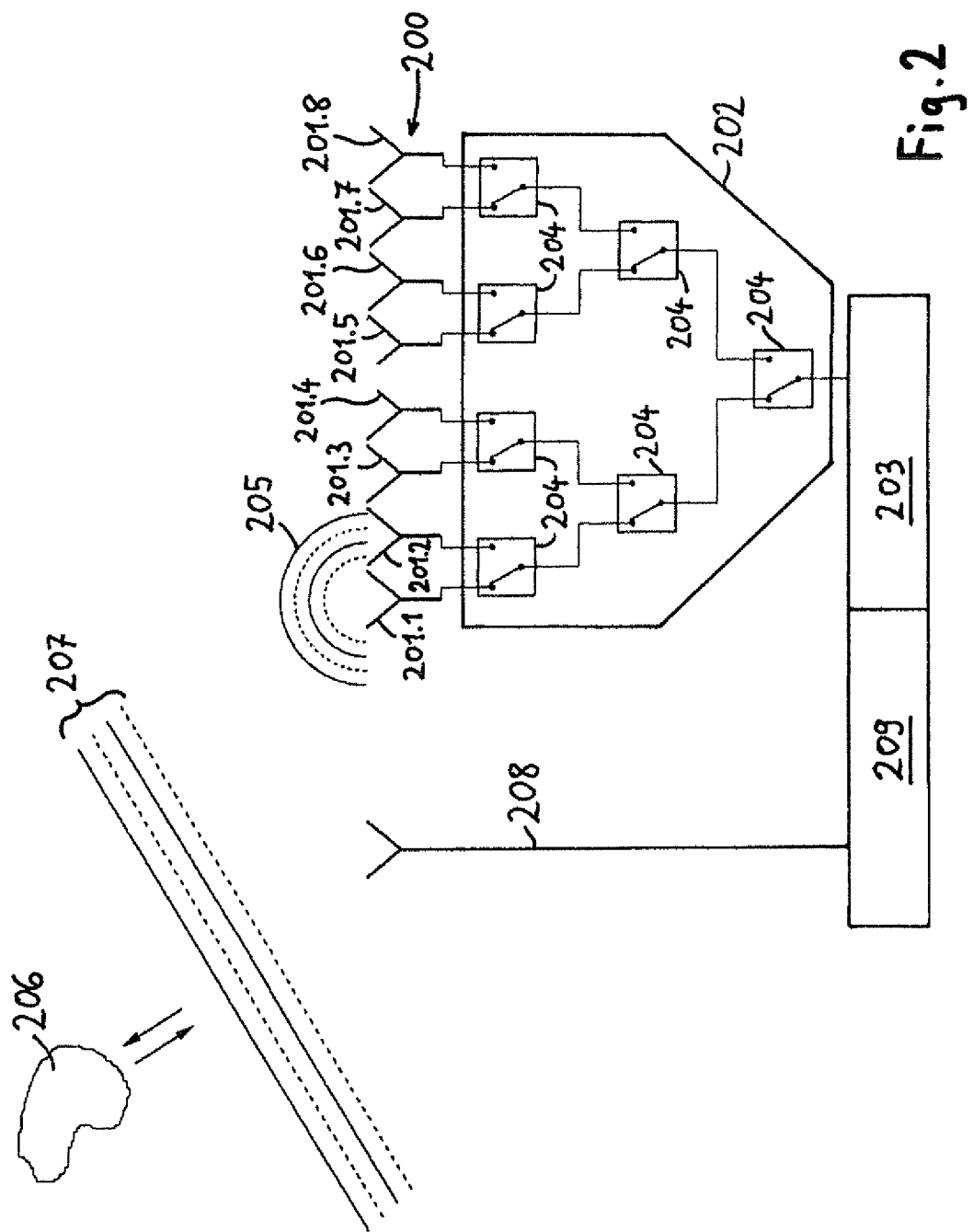
FIG. 2 is a radar sensor with an antenna array in the transmission path.

Such a form of embodiment is shown in FIG. 2. In such case, the antenna array 200 includes a plurality of transmission antennas 201.1 to 201.8, which can be connected via a switching unit 202 selectively one after the other with a transmitter unit 203 of a radar sensor. The switching unit 202 can in such case preferably be implemented as a switching tree and comprise a plurality of switching elements 204. During a switching clock period, one of the transmission antennas 201.1 to 201.8 is in each case active, and radiates an electromagnetic wave 205. This electromagnetic wave 205 is reflected off a target 206, and the reflected wavefront 207 can be received by a receiving antenna 208 and evaluated by an evaluation unit 209 of the radar sensor. During each switching clock period, especially, a characteristic phase of the received signal can be detected, which can then be associated with the particular active transmitting antenna. In this way, each transmitting antenna 201.1 to 201.8 of the antenna array 200 can be associated with a related phase of the received signal. Just as in the case of the form of embodiment described in FIG. 1, the angular position of the target 206 can be derived from the phase progression ascertained in this way.

According to a form of embodiment, the radar sensors shown in FIG. 1 and FIG. 2 can be radar sensors, which are designed to determine the distance to a target. Preferably, radar sensors are used, which work according to the FMCW (Frequency Modulated Continuous Wave) principle. In the case of separation measuring by means of radar according to the FMCW principle, a frequency-modulated radar signal is transmitted in continuous wave operation and reflected off the particular target, and the reflected signal is received and evaluated by the radar sensor.

The frequency of the transmission signal of the radar sensor can, in such case, be in the order of magnitude of 20 GHz to 100 GHz, wherein the frequency modulation typically has a bandwidth of 1 to 5 GHz. In order to be able to perform measurements according to the FMCW principle with a switched transmitting or receiving array, the switching clock period of the switching signal must be sufficiently long to allow the performance of a separation measurement during a switching clock period. In such case, the typically used switching clock periods lie in a range between 100 μs and 10 ms.

Figure 3:
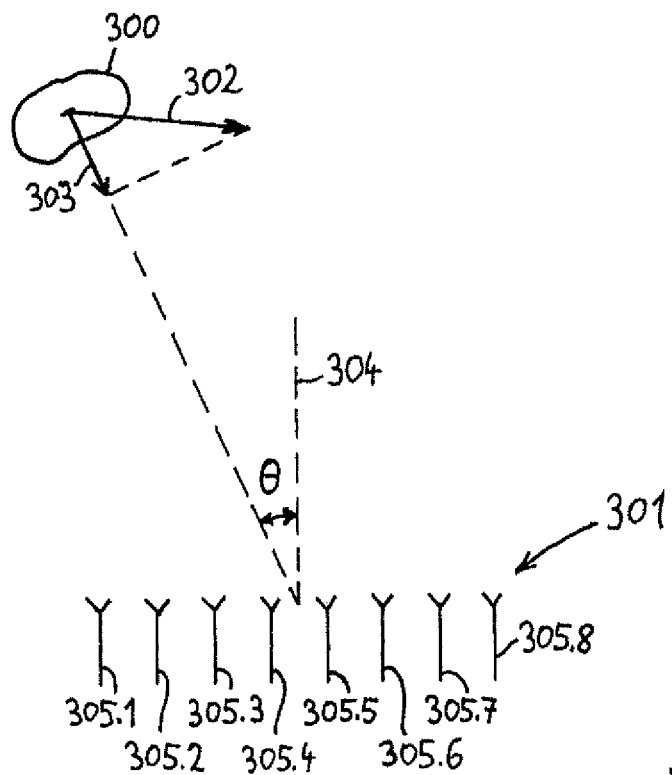
FIG. 3 is phase progression brought about by a moving target.

While in the case of the previously discussed static targets, a parallel and a sequential evaluation of the antenna signals are equivalent, in the case of moving targets, this is no longer the case, as is explained in the following. In FIG. 3, a target 300 is shown, which moves relative to the antenna array 301 with a velocity 302. The velocity 302 includes a radial velocity component 303 in the direction of the antenna array 301. This radial velocity component 303, which is first and foremost the operative component in the case of phase considerations, is also referred to in the following as velocity v. The angular position of the target 300 relative to the antenna array 301 is described by the angle θ to the normal 304.

The antenna array 301 shown in FIG. 3 includes eight antenna elements 305.1 to 305.8 arranged in a line. The elements are individually switched through to the receiving path, one after the other, from left to right. In the evaluation of the signals received by the antenna elements 305.1 to 305.8, a phase progression is received, which is composed of an angle-dependent phase contribution and a phase contribution caused by the radial velocity v. The velocity-dependent contribution arises, because during the switching of the antenna elements, the target 300 always moves further toward the antenna elements, and thereby causes an additional phase contribution. In this respect, the velocity-dependent contribution arises via the interworking of the radial velocity component 303 of the target 300 with the sequential switching of the antenna elements from left to the right, because during the switching, the target 300 always moves further toward the antenna array 301.

Figure 4:
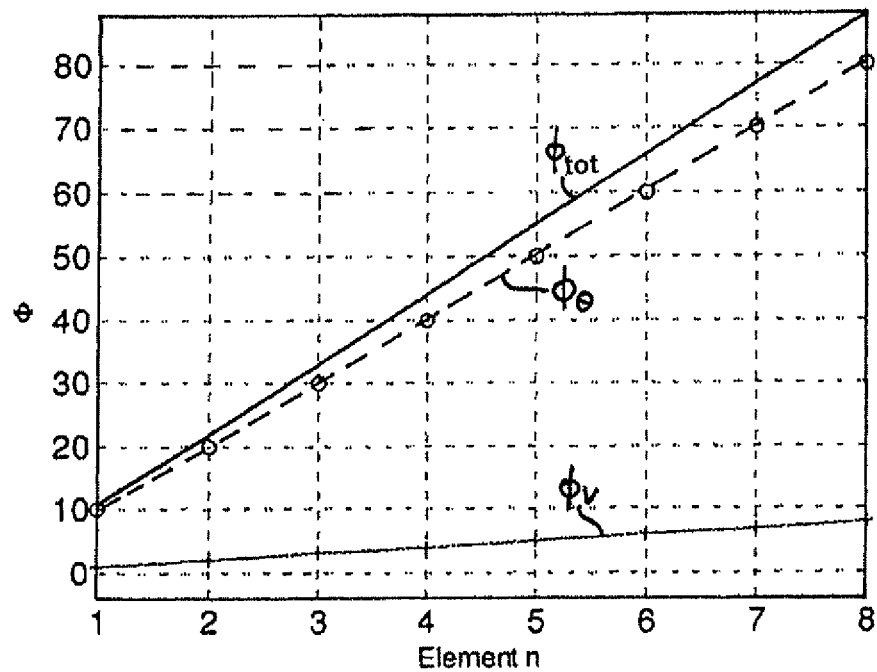
FIG. 4 is the superpositioning of an angle-dependent phase progression and a velocity-dependent phase progression in the case of a solution of the state of the art.

FIG. 4 presents the composition of the total phase progression for the antenna elements, wherein the different phase contributions for the eight antenna elements 305.1 to 305.8 are plotted from left to right. By the inclined incidence of the wavefront, an angle-dependent phase progression $\phi_\theta$ is caused, which in FIG. 4 is plotted as a dashed line. Additionally, from the radial velocity v, a velocity-dependent phase progression $\phi_v$ is caused, which likewise increases linearly in the case, in which the antenna elements are evaluated one after the other, from left to right. The angle-dependent linear phase progression $\phi_\theta$ and the velocity-dependent linear phase progression $\phi_v$ superimpose to form a total phase progression $\theta_{tot}$ of the signals received by the antenna elements. This total phase progression $\phi_{tot}$ is likewise drawn in FIG. 4. By evaluation of the antenna signals in the receiving path, the total phase progression $\phi_{tot}$ can be determined; however, it is not possible to separately obtain the angle-dependent part $\phi_\theta$ or the velocity-dependent part $\phi_v$, because the two fractions in each case make a linear phase contribution.

In order to be able to isolate the angle-dependent part of the total phase, according to the solution of the invention, it is provided that the switching sequence, corresponding to which the antenna elements of the antenna arrays are switched through one after the other, is modified in such a manner that the phase contribution caused by the velocity no longer delivers a linearly increasing phase progression.

According to the solution of the invention, it must furthermore especially be prevented, that the temporal switching sequence of the antenna elements of the array are switched through in sequence corresponding to their spatial arrangement, for this agreement between temporal switching sequence and spatial arrangement is responsible for the phase contributions caused by the velocity always behaving as an additional linear phase progression in the case of the previous solutions.

Corresponding to the forms of embodiment of the present invention, the temporal switching sequence for the antenna elements is consequently selected in such a manner that it does not exactly correspond to the spatial arrangement of the antenna elements in the array. Via such a selection of the switching sequence of the invention, it can be achieved that the angle-dependent part of the phase progression and the velocity-dependent part of the phase progression can be isolated from one another, so that especially the angular position of the target can also be exactly determined when the target moves.

Figure 5A:
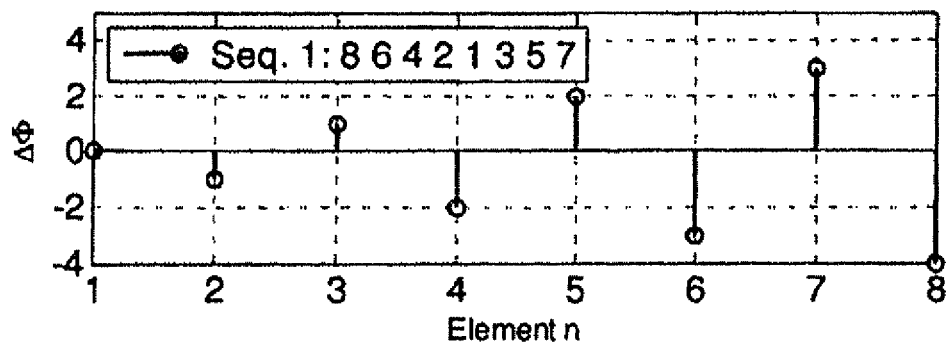
FIG. 5 is two examples of switching sequences of the invention for the antenna array.
Figure 5B:
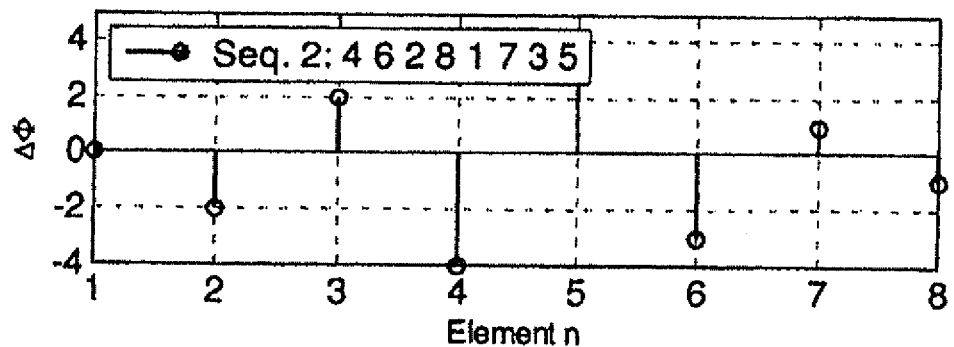

In FIGS. 5A and 5B, two examples for switching sequences of the invention are given. These sequences are designed in such a manner that the phase contribution caused by moving targets does not lead to an additional linear phase progression for the antenna elements. For each switching sequence, the respective resulting phase contributions $\Delta\phi$ are also graphically presented for the individual antenna elements.

In the case of the example of FIG. 5A, the eight antenna elements of the array are switched through according to the sequence "8 6 4 2 1 3 5 7". Thus, first the eighth antenna element is activated, then the sixth, the fourth, the second, etc. If it is assumed that the phase continuously increases as a function of time as a result of the movement of the target, then, by this switching sequence, the eighth antenna element is assigned the lowest phase, then the sixth antenna element the second lowest phase, the fourth antenna element a somewhat higher phase, etc. When the phase, which is assigned to the first antenna element by this switching sequence, is defined as 0, then the phase contributions $\Delta\phi$ shown in FIG. 5A result for the individual antenna elements. Based on FIG. 5A, it can be recognized, directly, that, in the case of application of the example switching sequence "8 6 4 2 1 3 5 7", no linearly increasing or linearly falling phase progression results for the phase contribution caused by the velocity.

In the case of the example shown in FIG. 5B, the antenna elements are switched through one after the other corresponding to the switching sequence "4 6 2 8 1 7 3 5". First, the fourth antenna element is activated, then the sixth, the second, then the eighth antenna element, etc. If it is assumed that the phase continuously rises during the switching sequence as a result of the movement of the target, then, by this switching sequence, the fourth antenna element is assigned the lowest phase, the sixth antenna element the second lowest phase, the second antenna element a somewhat higher phase, etc. If the phase assigned to the first antenna element is defined as 0, the phase contributions shown in FIG. 5B result for the individual antenna elements. Since the switching sequence "4 6 2 8 1 7 3 5" does not correspond to the spatial arrangement of the antenna elements in the array, no linearly rising or linearly falling phase progression results for the phase contribution caused by the velocity. This can be directly recognized from FIG. 5B.

According to another option, the switching sequence is selected in such a manner that both the negative phase contributions as well as also the positive phase contributions are distributed on the different antenna elements in such a manner that in the case of performance of a linear regression analysis for the phase contribution caused by the velocity, a line of regression with slope of 0 results. In other words, the phase contributions caused by the velocity are distributed on the antenna elements in such a manner that they make no contribution to the linear regression analysis of the total phase.

Figure 6:
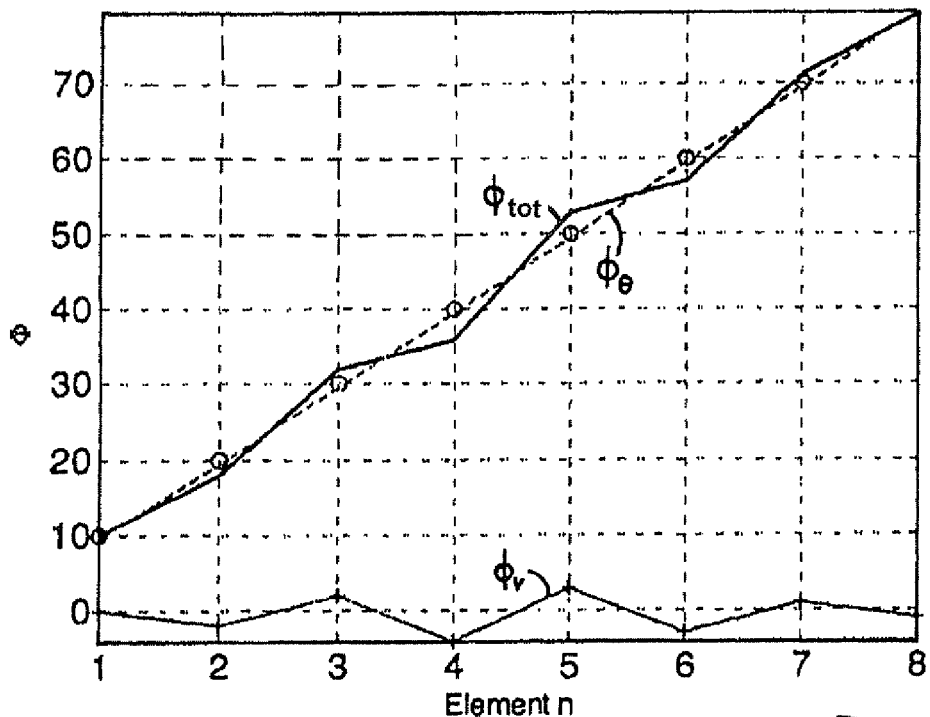
FIG. 6 is angle-dependent, velocity-dependent and total phase progression in the case of application of a switching sequence of the invention.

In FIG. 6, the angle-dependent phase contributions $\phi_\theta$, the velocity-dependent phase contributions $\phi_v$ and the resulting total phase $\phi_{tot}$ are illustrated for the case of application of the switching sequence "4 6 2 8 1 7 3 5" proposed in FIG. 5B for the different antenna elements. In such case, the total phase $\phi_{tot}$ is the sum of the velocity-dependent phase contributions $\phi_v$ and the angle-dependent phase contributions $\phi_\theta$.

The positive and negative phase contributions caused by the velocity $\phi_v$ are distributed over the antenna elements in accordance with the selected switching sequence "4 6 2 8 1 7 3 5". When a linear regression analysis is performed over the velocity-dependent phase contributions $\phi_v$, for instance with the method of least squares, a line with a slope of 0 results. Via a suitable selection of the switching sequence, it can thus be achieved that the regression line through the phase contributions caused by the velocity has a slope of 0. Therefore, a phase error is indeed introduced by the movement of the target; however, no additional linear phase progression is introduced.

By the angular position of the target, an angle-dependent phase progression $\phi_\theta$ linearly rising from left to right is brought about. When the velocity-dependent phase contributions $\phi_v$ are added to this angle-dependent phase progression $\phi_\theta$ in order to obtain the total phase progression $\phi_{tot}$, in the total phase progression $\phi_{tot}$, the velocity-induced fluctuations can indeed be detected, but the slope of the phase progression $\phi_{tot}$, however, remains essentially unchanged. In other words, the regression line through the total phase progression $\phi_{tot}$ has the same slope as the regression line through the angle-dependent phase progression $\phi_\theta$, because no additional linear regression is introduced by the velocity-dependent phase contributions in the case of a suitable selection of the switching sequence.

Thus, via application of a switching sequence of the invention, the evaluation of the angular position of the target is significantly simplified. The total phase $\phi_{tot}$ is directly obtained from the received signals of the individual antenna elements, and, by means of a linear regression analysis of $\phi_{tot}$, the slope of the regression line is determined. Since this slope in the case of the solution of the invention corresponds to the slope of the angle-dependent phase progression $\phi_\theta$, the angular position $\theta_{target}$ of the target can be obtained by linear regression analysis of $\phi_{tot}$.

Another option in the case of the selection of a suitable switching sequence is that the phase contributions caused by the velocity should, as much as possible, alternate in sign from antenna element to antenna element. In the case of the two switching sequences shown in FIGS. 5A and 5B, this is the case, because the even numbered antenna elements are in each case assigned the negative phase contributions and the odd numbered antenna elements are in each case assigned the positive phase contributions. Therefore, phase contributions in one direction alternate with phase contributions in the other direction.

In the direction of the antenna array, a spatially high-frequency phase variation of the signals received by the antenna elements caused by the velocity of the target is therefore obtained, and this phase variation caused by the velocity can be understood as a phase modulation in the space domain. Since angle domain and space domain are related with one another via the Fourier transformation, it is advantageous when the modulation in the space domain is as high-frequency as possible, so that that ghost targets in the angle domain lie as far as possible away from the actual target. The maximum possible spatial modulation frequency is received when the switching sequence is selected in such a manner that a sign of the phase contribution results, which alternates from antenna element to antenna element. The two switching sequences shown in FIG. 5A and FIG. 5B fulfill this condition; in their case, the sign of the phase contribution changes from one antenna element to the next. The two switching sequences shown in FIGS. 5A and 5B are, consequently, selected in such a manner that the ghost targets arising in the frequency domain occur as far as possible from the actual target.

Figure 7:
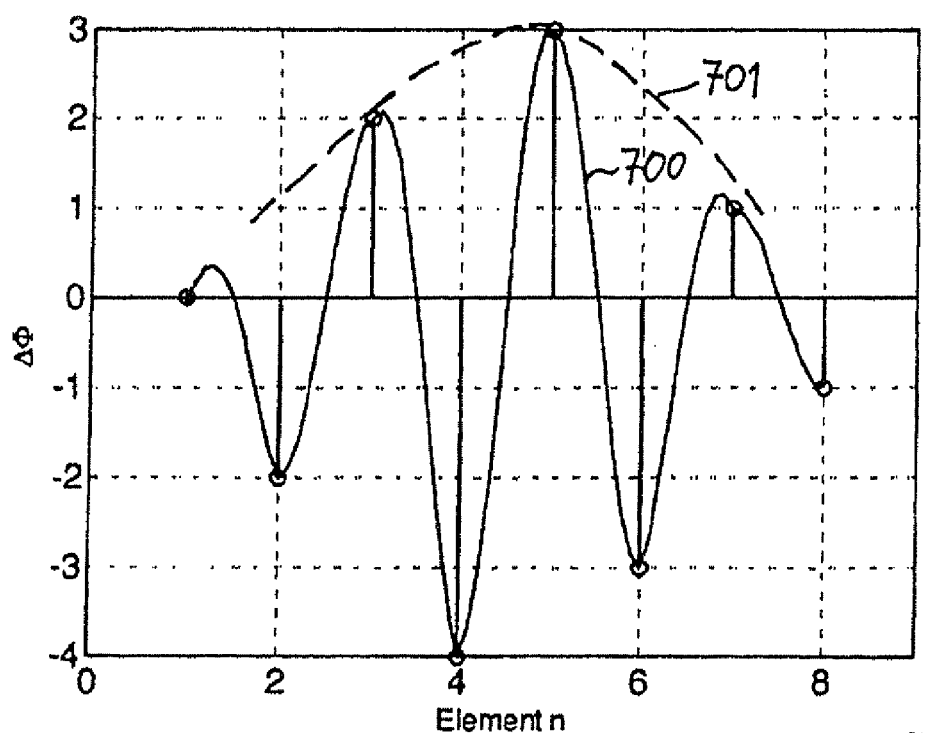
FIG. 7 is an illustration of the spatial modulation frequency in the case of a velocity-dependent phase contribution with alternating sign.

A phase contribution with an alternating sign can, as shown in FIG. 7, be interpreted as a sampled sine function 700, which is weighted with a window function 701. The modulation frequency of the sine function 700 depends in such case only on the separation d of the antenna elements, not, however, on the velocity of the target. In this respect, the spatial modulation frequency is predetermined by the geometry of the antenna array. This means that ghost targets, independently of the target velocity, always show up at a predictable position in the frequency domain. Moreover, it can be shown that in the angle domain, a certain region around the antenna axis always remains free of such ghost targets. In the case of a typical separation of the antenna elements of, for instance, a half wavelength, an angular range of, for example, about ±30° around the array axis can be mapped angle-true and free of ghost targets.

Along with the above, the selection of the enveloping window function 701 in FIG. 7 also plays an important role. Of advantage are window functions, which, in the case of periodic continuation, contain as little discontinuities (high-frequency spectral parts) as possible. The application of such window functions has the result that the angle spectrum in the vicinity of the ghost targets decays rapidly, and thus the side lobe level is not unnecessarily increased. The window function 801 can indeed not be explicitly predetermined; however, it can be influenced with goals in mind by the selection of the switching sequence and of the points in time of switching. For example, in the case of application of the switching sequence "8 6 4 2 1 3 5 7" shown in FIG. 5A, a ramp-shaped envelope results for the phase contributions caused by the velocity, while in the case of application of the switching sequence "4 6 2 8 1 7 3 5" shown in FIG. 5B, there results for the phase contributions caused by the velocity a sinusoidal envelope, which is especially advantageous.

Figure 8:
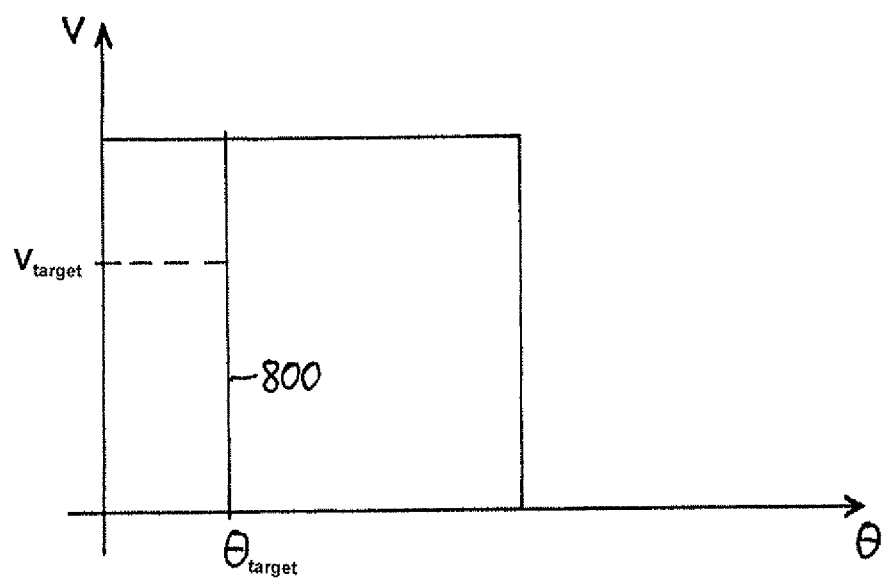
FIG. 8 is a schematic representation of the θ×v space.

The solution of the invention thus enables an angle-true mapping of moving targets, as well as a fast determination of the angular position $\theta_{target}$ of the target. Along with that, the invention also enables a simplified ascertaining of the radial velocity v of the target. This is shown in FIG. 8 based on a schematic representation of the θ×v space. Since, in the case of the solution of the invention, the angular position $\theta_{target}$ can be determined independently of the velocity v, the possible solutions in the θ×v space can be limited to the line 800 determined by $\theta=\theta_{target}$. In this respect, the velocity measurement is limited to a simple one dimensional maximum search in the θ×v space along the line 800 determined by $\theta=\theta_{target}$. As a result of this search, the velocity $v_{target}$ of the target can be determined.

The invention claimed is:

1. An antenna array for a radar sensor, comprising:
a number of antenna elements linearly arranged next to one another and designed for transmitting or receiving a radar signal;
a transmitting or receiving unit; and
a switching unit, designed to connect said antenna elements individually one after the other in time with said transmitting or receiving unit according to a predetermined switching sequence, wherein:
the switching sequence, according to which said antenna elements are connected one after the other with said transmitting- or receiving unit, deviates from the spatial sequence of said antenna elements in the antenna array,
the received signals associated with said antenna elements corresponding to the switching sequence have, in each case, a phase, which includes a phase contribution caused by the angular position of the target and a phase contribution caused by the velocity of the target; and
the switching sequence is determined in such a manner that the phase contributions caused by the velocity of the target change in sign along the arrangement of said antenna elements from one antenna element to a neighboring antenna element.

2. A radar sensor, comprising:
a transmission path for the production and transmission of a transmission signal;
a receiving path for receiving received signals reflected from a target;
an antenna array with a number of antenna elements linearly arranged next to one another;
a transmitting or receiving unit; and
a switching unit, wherein:
said antenna array is arranged either in the transmission path as a transmission antenna array or in the receiving path as a receiving antenna array;
said switching unit, is designed to connect said antenna elements according to a predetermined switching sequence individually, one after the other in time, with said associated transmitting or receiving unit; and
the switching sequence, according to which said antenna elements are connected one after the other with said transmitting or receiving unit, deviates from the spatial sequence of said antenna elements in said antenna array.

3. The radar sensor as claimed in claim 2, wherein:
said antenna array is arranged in the transmission path as a transmission antenna array; and
said switching unit is designed to connect said antenna elements according to the switching sequence individually, one after the other in time, with the associated transmitting unit of the radar sensor.

4. The radar sensor as claimed in claim 3, wherein:
the receiving path is designed to ascertain an associated received signal for each antenna element connected one after the other with said transmitting unit.

5. The radar sensor as claimed in claim 2, wherein:
the antenna array is arranged in the receiving path as a receiving antenna array; and
said switching unit is designed to connect said antenna elements corresponding to the predetermined switching sequence individually, one after the other in time, with said receiving unit of the radar sensor.

6. The radar sensor as claimed in claim 5, wherein:
the receiving path is designed to ascertain an associated received signal for each antenna element connected one after the other with said receiving unit.

7. The radar sensor as claimed in claim 2, wherein:
the radar sensor is designed to determine at least one of an angular position and velocity of the target.

8. The radar sensor as claimed in claim 1, wherein:
the phase contribution for said respective antenna elements caused by the angular position of the target is independent of the selection of the switching sequence.

9. The radar sensor as claimed in claim 1, wherein:
the phase contribution for the received signals caused by the velocity of the target depends on the switching sequence, corresponding to which said antenna elements are connected with said transmitting or receiving unit.

10. The radar sensor as claimed in claim 1, wherein:
the transmission path of the radar sensor is designed to produce a transmission signal modulated corresponding to an FMCW principle, and that the receiving path of the radar sensor is designed to demodulate and to evaluate a received signal modulated corresponding to the FMCW principle.

11. The radar sensor as claimed in claim 10, further comprising:
a switching clock of the switching sequence designed in such a manner that, during a switching clock period, an FMCW measurement is performable for an antenna element connected with said transmitting or receiving unit.

12. The method for operation of a radar sensor, which includes a transmission path for production and transmission of a transmission signal, a receiving path for receiving received signals reflected from a target, and an antenna array with a number of antenna elements linearly arranged next to one another, comprising the steps of:
arranging the antenna array either in the transmission path as a transmission antenna array or in the receiving path as a receiving antenna array,
connecting the antenna elements individually, one after the other in time, with an associated transmitting or receiving unit of the radar sensor according to a predetermined switching sequence;
determining the deviation of the switching sequence from the spatial sequence of the antenna elements in the antenna array, wherein:
the received signals associated with said antenna elements corresponding to the switching sequence have, in each case, a phase, which includes a phase contribution caused by the angular position of the target and a phase contribution caused by the velocity of the target, and further comprising the step of: determining the switching sequence in such a manner that the phase contributions caused by the velocity of the target change in sign along the arrangement of said antenna elements from one antenna element to a neighboring antenna element.

13. The method as claimed in claim 12, comprising the steps of:
establishing a switching sequence not corresponding to the spatial sequence of said antenna elements in said antenna array, and
distinguishing phase contribution caused by the angular position of the target and phase contribution caused by the velocity of the target.

14. The method as claimed in claim 12, comprising the step of:
defining the switching sequence in such a manner that phase contributions caused by the velocity of the target make essentially no contribution to a linear regression analysis of the phases associated with said antenna elements.

15. The method as claimed in claim 12, comprising the step of:
defining the switching sequence in such a manner that a regression line through the phase contributions caused by the velocity of the target essentially has a slope of zero.

16. The method as claimed in claim 12, comprising the step of:
deriving the angular position of the target from the slope of a regression line through the phases of the received signals associated with said antenna elements.

17. The method as claimed in claim 12, comprising the step of:
determining the switching sequence in such a manner that the phase contributions caused by the velocity of the target exhibit a high-frequency spatial phase modulation along the linear spatial arrangement of said antenna elements.

18. The method as claimed in claim 12, comprising the step of:
determining the switching sequence in such a manner that the phase contributions associated with the individual antenna elements and caused by the velocity of the target correspond to an envelope curve, whose shape opposes development of phantom targets in the angular range.

* * * * *